METHOD OF TREATING PHOTOCONDUCTORS OF THE CADMIUM SERIES TO FORM ELECTROPHOTOSENSITIVE MATERIAL MANIFESTING PERSISTENT INTERNAL POLARIZATION

Filed Aug. 19, 1968

United States Patent Office 3,595,646
Patented July 27, 1971

3,595,646

METHOD OF TREATING PHOTOCONDUCTORS OF THE CADMIUM SERIES TO FORM ELECTROPHOTOSENSITIVE MATERIAL MANIFESTING PERSISTENT INTERNAL POLARIZATION

Koichi Kinoshita, Narashino-shi, Japan, assignor to Katsuragawa Denki Kabushiki Kaisha, Tokyo-to, Japan Filed Aug. 19, 1968, Ser. No. 753,494
Claims priority, application Japan, Aug. 22, 1967, 42/53,429
Int. Cl. G03g 5/02, 5/08
U.S. Cl. 96—1.5 5 Claims

ABSTRACT OF THE DISCLOSURE

An impurity is diffused, by firing, into the surface of photoconductive material of the cadmium series to form a thin surface layer containing deep trap levels whereby to obtain an electrophotosensitive material manifesting persistent internal polarization effect.

BACKROUND OF THE INVENTION

This invention relates to a method of preparing electrophotosensitive materials of the cadmium series which exhibit intense persistent internal polarization effect but do not exhibit external photoelectric effect and photosensitive element, utilizing said electrophotosensitive materials.

More particularly, this invention relates to a method of converting electrophotosensitive materials of the cadmium series which could not be used for the persistent internal polarization method (hereinafter abbreviated as P.I.P. method) into materials suitable for use in P.I.P. method by diffusing impurities into the surface of the materials by firing them without utilizing any coactivator whereby to form thin surface layers containing deep trap levels.

Among photoconductors of the cadmium series are included Cds, CdSe, Zn Cds etc., which are activated by copper, silver and the like metal or impurity. While this invention is applicable to any one of these materials, for the sake of description, the invention will be described hereunder with reference to Cds.

Owing to its high photosensitivity, CdS has been used in various types of photosensitive elements and various efforts have been made to render it suitable for use in the P.I.P. method. However, only a very limited number of attempts has succeeded in giving satisfactory results.

One reason is that the phenomenon according to which charge carriers are trapped in deep trap levels—which is the basic phenomenon of the P.I.P. method—and high sensitivity contradict each other. Ordinarily, the high photosensitivity of CdS crystals is caused by the increase in the effective concentration of electrons which are excited into a conductive band in response to light excitation due to interaction between deep impurity levels provided by activators such as Cu and shallow impurity provided by coactivators such as Cl and Br.

Dependent upon the type of the impurity and the selected atmosphere utilized to fire the crystals of CdS, the activator may or may not be used. However, since defects in the crystals formed by the acivator and coactivator cooperate with each other to compensate for their electrical neutrals to readily control the state of distribution of the defects in the crystals, almost all practical CdS materials are prepared by utilizing both activator and coactivator.

In most cases, the depth of the impurity levels formed in these CdS crystals is not suitable for the P.I.P. phenomenon. Generally the depth is so shallow that charge carriers are not trapped in trap levels over a long period but are readily reexcited by thermal excitation. Incorporation of an additional suitable impurity for the purpose of promoting the P.I.P. effect will result in a decrease in the life of excited electrons, thus losing high photosensitivity inherent in CdS. For this reason, it has been impossible to improve the P.I.P. characteristic of CdS crystals while preserving their desirable photosensitivity.

The second reason lies in the rapid decrease in the dark resistance of CdS crystals upon application of high voltage. As is well known in the art, CdS crystals are satisfactory photoconductive materials in a relatively low voltage range and have been used extensively because they are available more readily than other types of photoconductors. However, when they are operated under a high-voltage electric field as photosensitive elements for electrophotography, for example, due consideration should be made to increase their dark resistance. As discussed herein above, increase in the dark resistance results in a decrease in the photosensitivity.

For this reason, in spite of their high photosensitivity, CdS crystals have been considered not suitable for use in preparing photosensitive elements for electrophotography or other elements utilizing the P.I.P. effect and operating under high applied voltage. Although it was reported that a weak latent image could be obtained in low-voltage ranges when a photosensitive element comprising a combination of a current blocking film and a photosensitive layer of CdS is used in electrophotography, it is also well known that increase in the applied voltage results in complete loss of the P.I.P. latent image. Thus, such electrophotography has no practical value.

SUMMARY OF THE INVENTION

I have investigated a method of converting photoconductive materials of the cadmium series into materials which are capable of eliminating various defects mentioned above and which do not lose dark resistance under high applied voltage and have discovered a novel method by which surface layers of photoconductive crystals of the cadmium series can be converted into highly insulative layers containing deep trap levels, thus producing photoconductive crystals having high photosensitivity and excellent P.I.P. characteristic. The basic concept of this invention lies in the forming by diffusion of deep trap levels effective for the P.I.P. effect in the surface layers of commercially available photoconductive crystals of the cadmium series and limiting this diffused region to the surface layers of the photoconductive crystals. As above described, the purpose of utilizing the coactivator for the purpose of providing satisfactory photoconductive crystals is to compensate electrically for the effect caused by the diffusion of the activator into the crystals. It is well known to one skilled in the art that in the absence of the coactivator, the speed of diffusion of the activator into the crystals is extremely decreased.

On the basis of these facts, this invention contemplates the incorporation, at a high concentration, of an activator (a particular impurity) by diffusing it into the surface layers of crystals of the cadmium series having high photosensitivity, care being taken not to diffuse such impurity into the interior of the crystals, whereby to form surface layers or trap layers having deep trap levels on the surfaces of the crystal and to utilize the high insulating strength of such surface layers to provide photosensitive crystals capable of exhibiting satisfactory P.I.P. effect even under high applied voltage. In order to form the trap layer only in the surface portion, it is necessary to control or limit the speed of diffusion of the added impurity into the interior of the crystal. I have succeeded in attaining this object without employing any coactivator by adding a salt of monovalent and impurity metal and sulfur to a powder of photosensitive crystals of the cadmium series activated with the metal and Cl or Br, and firing the mixture in an inert atmosphere or air.

In the interior of CdS crystals fired as above described, the photoconductive mechanism is preserved without being impaired by the firing process, but the surface of each crystal is covered by a layer of extraordinarily high impurity concentration, thus greatly increasing the density of free electrons formed in the crystals when they are illuminated by light. Consequently, such CdS crystals have a high photosensitivity, and when D-C electric voltage is applied across these crystals, free electrons are trapped positively in impurity levels in their surface. As the depth of trap levels is selected to be suitable for establishing the desired P.I.P. phenomenon, it is possible to provide ideal P.I.P. materials. Since trap layers formed in this way have an extremely high resistance, there is no possibility of lowering the dark resistance under high applied voltage. As a result, photosensitive elements containing these CdS crystals are suitable for use in electrophotography to form intense electrostatic latent images.

One aspect of this invention lies in a photosensitive element utilizing the novel powdered crystals of the cadmium series which manifest intense persistent internal polarization effect but do not manifest external photoelectric effect. According to one embodiment of the invention, the powdered crystals of CdS are bonded by an insulative transparent binder to form a thin photosensitive layer and a transparent highly insulative layer is integrally bonded to one surface of the photosensitive layer, thus completing a photosensitive element. Alternatively, a thin metal electrode is applied or integrally bonded to the opposite surface of the photosensitive layer. The photosensitive element is utilized in the form of a flat sheet or wound upon a metal cylinder to form the latent image. In other embodiment of the invention, transparent films of synthetic resin are integrally bonded to both surfaces of the photosensitive layer and a thin electrode layer is applied to either one of the resionous films to complete a photosensitive element.

Another aspect of this invention involves a novel method of preparing photosensitive powdered crystals of the cadmium series and having the above described novel characteristics. According to another embodiment of this invention, a salt of a metal acting as an impurity and sulfur are added to photoconductive crystal of the cadmium series and activated by the metal and Cl or Br, and the mixture is fired in the absence of any coactivator to obtain photosensitive powdered crystals having deep trap levels and manifesting intense persistent internal polarization effect but not manifesting external photoconductive effect. Surplus sulfur is removed by rapidly exhausting the firing atmosphere at the end of the firing step which is performed in an inert atmosphere such as nitrogen.

BRIEF DESCRIPTION OF THE DRAWING

The invention can be more fully understood from the following description taken in conjunction with the accompanying drawing in which.

DESCRIPTION OF PREFERRED EMBODIMENT

The followngs are examples of this invention, but it should be understood that the invention is not limited to these specific embodiment thereof.

Example 1

The first firing step.—A powder of highly purified CdS having an average particle size of 0.1 micron was mixed with $CuCl_2$ $CdCl_2$ and $NH_4Cl$ in proportions as shown in Table 1 below. Water was added to the mixture, and the mixture was then thoroughly mixed and dried.

TABLE 1

| | | |
|---|---|---|
| CdS | gr | 100 |
| $CdCl_2$ | gr | 10 |
| $NH_4Cl$ | gr | 1 |
| $CuCl_2$ | mgr | 1 |

The above described sample was placed in a quartz tube and fired for 15 minutes at a temperature of 600° C. The resulted crystals had an average particle size of about 10 microns and manifested high photoconductivity after they were washed with water and dried.

The second firing step.—To the CdS crystals obtained by the first firing step were added and mixed S and $CuSO_4$ in quantities as shown in Table 2 below and the mixture was placed in another quartz tube. After air was evacuated from the quartz tube, $N_2$ gas was introduced into the tube to form a $N_2$ gas atmosphere. Under this state the mixture was fired for 15 minutes at a temperature of 600° C. $N_2$ gas in the tube was discharged rapidly and the tube was cooled, thus finishing the firing step.

TABLE 2

| | | |
|---|---|---|
| CdS resulting from the first firing step | gr | 100 |
| S (sublimated sulfur) | gr | 0.2 |
| $CuSO_4$ | mgr | 1 |

While the copper in the form of $CuCl_2$ or $CuSO_4$ is divalent, the copper which is liberated by the decomposition of these compounds and diffused into the crystal to act as the impurity is monovalent.

The sample resulting from the second firing step had an average particle size of about 10 microns, thus indicating no growth of the crystal.

Figure 1:
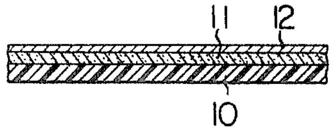
FIGS. 1 to 3 are sectional views of three types of photosensitive elements which utilize the photosensitive CdS crystals prepared in accordance with this invention and are especially suitable for use in electrophotography and FIG. 4 is a diagrammatic view to illustrate an electrophotographic apparatus utilizing the photosensitive element shown in FIG. 1.

In contrast, the photoconductivity was reduced to about 1/10000 of that of the sample resulting from the first firing step, and the dark resistance was increased about 10 times. CdS crystals thus obtained were used to fabricate a photosensitive element. As shown in FIG. 1 on one surface of a film 10 of a transparent synthetic resin of the polyester series having a thickness of 6 microns was applied a layer 11 of a uniform mixture consisting of the CdS crystals prepared by the first and second firing steps described above, vinyl acetate of 1/7 of the quantity of the CdS (weight ratio), and to toluene (solvent), the layer being then dried. The quantity of the applied mixture was controlled to give a dry thickness of the photosensitive layer of 80 microns. It was found that layers 10 and 11 were bonded integrally.

After completely drying the photosensitive layer 11, a suitable commercial electroconductive paint was sprayed on one surface there of to form an electrode 12 and then the coated electrode was dried to complete a photosensitive element. Instead of the electroconductive paint, a metal foil or conductive glass may be used.

This photosensitive element shown in FIG. 1 was used in an electrophotographic process and a latent image was formed by a method comprising the steps of applying a transparent electrode upon the highly insulating layer, applying a first D—C field of +500 volts across electrode layer 12 and the transparent electrode for 0.1 second, applying a second D—C field of −500 volts for the same interval, and projecting a light image having a brightness of 40 luxes at its bright portions on the photosensitive element through the transparent electrode and through the polyester film concurrently with the application of the second D—C field. The polarization latent image formed had a polarization potential of +350 volts at portions corresponding to bright portions of the light image and a polarization potential of +100 volts at portions corresponding to dark portions of the light image. After shorting the transparen telectrode and the electrode layer in the dark, the transparent electrode was removed. Then the latent image was developed in the dark. The latent image thus formed can be developed by any suitable developer consisting of electrically charged finely divided particles commonly used in ordinary electrophotography to provide an intense and clear visible image, which powder image can be transfer printed on a suitable printing medium such as paper, film or the like by the well-known transfer printing technique.

After transfer printing, developer powder remaining on the surface of the photosensitive element can be removed by a brush and the residual latent image can be released by illuminating with light.

After erasure, the photosensitive element can be used repeatedly to form latent images without the accompaniment of the phenomenon of hysteresis, thus always producing clear images. When a transparent electrode was placed upon the polyester resin film 10 and a polarization latent image was formed by applying the first and second fields across electrode 12 and the transparent electrode, it was found that the latent image formed could preserve its original intensity over a long period at room temperature by short circuiting the two electrodes and by storing the photosensitive element in the dark.

Although the highly insulative current blocking layer or polyester resin film 10 is effective for establishing the desired persistent internal polarization, it was noted that even when such a layer is omitted, sufficiently intense persistent internal polarization can be established so long as the novel CdS photosensitive material is used. Example 2 illustrates such amodified photosensitive element.

Example 2

Figure 2:
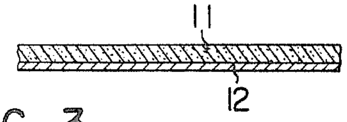

As shown in FIG. 2, a modified photosensitive element comprising photosensitive layer 11 containing CdS powder and electrode layer 12 were prepared in the same manner as described in Example 1, and a latent image was formed by the same method except that +400 volts and −400 volts were used as the first and second voltages, respectively. As a result, a polarization latent image was formed having a polarization voltage of +350 volts at portions corresponding to bright portions of the light image and of −100 volts at portions corresponding to dark portions of the light image. The latent image was developed with an ordinary charged finely powdered developer, whereupon an intense and clear visible image was obtained.

For comparison, a photosensitive element was prepared by using a conventional powder of photosensitive CdS crystals, and the same steps of forming a latent image as those outlined above were carried out, but no latent image was obtained.

Thus, this example shows that the novel photosensitive CdS crystals have sufficiently high insulating strength so that the photosensitive element containing it can manifest sufficiently high P.I.P. effect without providing any curent blocking layer. However, in order to use repeatedly the photosensitive element, it is advantageous to provide a highly insulative film or layer integrally bonded to the photosensitive layer, thus increasing mechanical strength and flatness of the surface of the photosensitive element.

Figure 3:
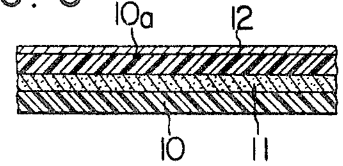

FIG. 3 shows a still further modification of the photosensitive element. In this embodiment, highly insulative films 10 and 10*a* are integrally bonded to the opposite sides of a photosensitive layer 11 identical to that shown in FIG. 1, and a conductive electrode layer 12 is applied to the surface of one of the highly insulative films.

Figure 4:
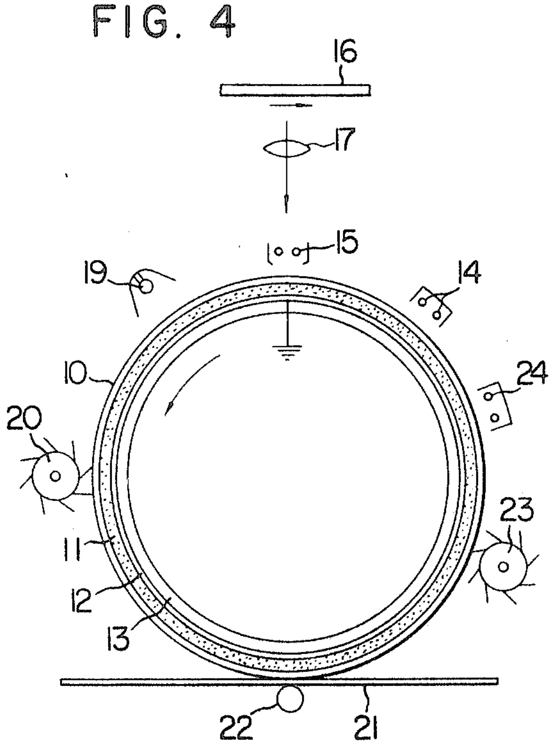

FIG. 4 shows a typical electrophotographic apparatus of the corona discharge type to form latent images by utilizing the photosensitive element shown in FIG. 1. More particularly, the photosensitive element is wrapped around a metal cylinder 13 rotating at a constant speed with insulator film 10 faced outwardly. The photosensitive element first passes beneath a first corona discharge electrode 14 supplied with a D-C voltage of one polarity, for example +7000 volts to receive a uniform charge on the surface of the insulative film layer 10. Then the element passes beneath a second corona discharge electrode 15 supplied with D-C voltage of the opposite polarity, for example −7000 volts, to be subjected to an electric field of the opposite polarity. Concurrently therewith, a light image of an object 16 which is moved synchronously with the metal cylinder in the direction of the arrow is projected upon the photosensitive element through an optical system represented by a lens 17 and through the second corona discharge electrode 15. As diagrammatically shown, the second corona discharge electrode is so constructed as not to interfere with the projection of the light image. Then an electrostatic latent image corresponding to the light image is formed on the surface of the insulator layer. Where the brightness of the light image is 15 luxes, the potential of the light image is −1200 volts at portions corresponding to the bright portions of the light image, whereas it is −100 volts at portions corresponding to dark portions of the light image. Uniform light is then projected upon the photosensitive element from a release lamp 19 for the purpose of depolarizing the internal polarization in the element while preserving the electrostatic latent image formed on the surface of insulating layer 10.

The electrostatic latent image may then be developed in any conventional manner. In the illustrated example, a mixture comprising a coloured and electrically charged powder of a thermoplastic resin and iron powder is applied onto the surface of the photo sensitive element by a device 20 including a rotary brush. The image developed in this manner by the adhesion of dry ink is then transfer printed onto a continnously moving paper 21 which is urged against the surface of the photosensitive element by a roller 22. Developer powder remaining on the element after transfer printing is wiped off by a cleaning device in the form of a rotary brush 23. The element is then subjected to an A-C field supplied by A-C discharge electrodes 24 to erase any remaining latent image of hysteresis to prepare for a new cycle of image forming operation. It is clear that where the cylinder 13 is made of an electroconductor, electrode layer 12 may be omitted.

The mechanism of forming trap levels by the firing step according to this invention is believed to be as follows:

As has been discussed in connection with Example 1, since Cu and Cl, respectively acting as an activator and a coactivator, are added to CdS powder utilized in the first firing step, the Cu forms an impurity level at a level of about 1.0 ev. above the filled band while Cl forms an impurity level at a level of about 0.3 ev. below the conduction band. In this case, respective impurity levels operate as a hold trap and an electrotrap, but as the trap level formed by Cl is very shallow, electrons trapped therein are readily reexcited into the conduction band by a thermal excitation, whereby the effective density of electrons in the conduction band is increased. This mechanism of photoconductivity is the same as the well known mechanism of ordinary CdS:Cu:Cl. However, there occurs a large difference as the result of the second firing step. Because the impurity to be added is Cu alone, which serves as the activator, and there is no coactivator, the mixture is fired under a condition in which doping is extremely difficult. The reason for doping of the impurity being difficult under this condition is the absence of the other impurity which compensates for the electrical strain formed when doping $Cu^+$ in the crystals. During the first firing step $Cl^-$ provides this compensation. However, judging from the result of my experiment, it is thought that the agent which electrically compensates for the strain created by the doping of $Cu^+$ is the lattice space of Cd. As the lattice space of Cd formed in this case is far deeper than the electron trap formed by $Cl^-$, thermal reexcitation of trapped electrons can be prevented, thus greatly enhancing the persistent internal polarization effect. Further, as it is not easy to dope the activator alone, the speed of diffusing Cu alone into the crystals by the mechanism described above is very slow. For this reason, a very thin trap layer containing the impurity at a high concentration is formed on the surface of each photoconductive CdS crystal prepared by the second firing step. Due to this thin trap layer, the photoconductive crystal obtained by the second firing step preserves the photoconductive mechanism therein, and the density of migrating electrons is not reduced upon application of a D-C field concurrently with light illumination. This contributes to the preservation of the speed of establishing the persistent internal polarization. The presence of the surface layer of high impurity concentration increases, the D-C resistance of the crystal surface, thus ensuring the above described desirable characteristics.

An important feature which should be noted is that this high resistance of the surface layer of the crystal together with the utilization of the highly insulative binder effectively prevents transfer of charge carriers between crystals.

The powder of CdS crystals prepared according to this invention and having extremely high surface resistance manifests significant P.I.P. phenomenon for incident light and effectively preserves this phenomenon so that it is suitable for use in preparing photosensitive elements for electrophotography and memory elements for storing various light images. Generally speaking, CdS crystals of this invention are, important for use as the material which varies its capacitance when illuminated by light under a D–C field.

Cl utilized as the coactivator when firing the photoconductive CdS crystals may be replaced by Br. This can be readily understood from the theory of crystal structure. I have succeeded in obtaining satisfactory photoconductive CdS crystals by utilizing Br. as the coactivator in substantially the same manner as Cl. More particularly, in the first firing step of Example 1 the same quantities of $CdBr_2$, $NH_4Br$ and $CuBr_2$ were used instead of $CuCl_2$, $CdCl_2$ and $NH_4Cl$ to obtain satisfactory photoconductive CdS crystals.

However, it was found that when I was substituted for Cl, it was extremely difficult to obtain CdS crystals manifesting the desired photoconductivity, and increase in the quantity of the coactivator did not result in improvement of the photoconductivity. Further, it was found that the use of F was quite impossible. The above described findings depend upon the chemical activity of halogen elements, and it is considered that F and I chemically combine with CdS crystals, thus losing their ability to act as impurities. The desired characteristics of the photosensitive CdS crystals prepared according to this invention can be assured by providing extremely thin trap layers on the surface of the crystals. However, it should be understood that the method of forming trap layers by firing can be varied with equal results. For example, $N_2$ gas utilized in the second firing step may be replaced by an other inert gas because the purpose of utilizing $N_2$ in the second firing step is to prevent oxidation of the surface of crystals during heating, thus preventing doping with impurities other than Cu.

Furthermore, any suitable impurity may be used for doping in the second firing step. For example, monovalent metals such as Ag provide the same result as Cu. The novel method can also be applied to other photoconductors of the cadmium series such as CdS and ZnCdS with equal results. Generally, the novel method is applicable to any photoconductive material whose photoconductive effect is assured by impurity levels and which can withstand the high temperature utilized in the firing step. Further, the copper salt which is incorporated for the purpose of doping copper is not limited to $CuSO_4$ described above but may be substituted by such a salt as $CuCl_2$, $Cu(No_3)_2$ or $CuCO_3$. However, the result of experiments indicated that $CuSO_4$ was most effective.

In some cases, firing may be carried out in air instead of in a $N_2$ atmosphere. In this case, however, the quantity of sulfur (in the form of fine powder) should be increased slightly. Vapour of sulfur surrounding the sample at a high concentration prevents the sample conducting air thus establishing a condition similar to the firing in an inert atmosphere.

The rapid removal of the inert atmosphere carried out at the end of the second firing step is not necessary where sulfur vapour is utilized so long as the coating of sulfur deposited on the surface of crystals does not cause any serious trouble. Sulfur coating causes trouble where the fact that the insulation resistance of sulfur is lower tan that of the high resistance surface layer formed on the crystal according to this invention is objectional and where slight photoconductivity manifested by S is not desirable. It was noted that where remaining sulfur is rapidly removed at the end of the second firing step, the dark resistance of the final product has decreased about one order of magnitude and that the resistance under light illumination has also decreased by one to two order of magnitude. However, even when remaining sulfur is not removed, the product can be used in practical applications where extremely high resistanc is not necessary.

With regard to quantity of copper to be used for doping in the second firing step, the above mentioned very small quantity of copper of the order of $1/_{10,000}$ based on the total quantity of CdS gives satisfactory reuslts. Even when the quantity of copper was varied in a rang of from $10^{-5}$ to $10^{-4}$, by weight no significant change in the characteristics of the final CdS crystals was noted. This is because Cu which was incorporated at the above described ratio with respect to the total quantity of CdS concentrated essentially in the thin surface layer, thus resulting in high concentrations sufficient to provide the desired characteristics, and even when trap levels of excessive high concentration were formed, such levels were at constant depth and did not act as recombination centers, thus assuring the P.I.P. characteristic. Thus, variations in the concentration of impurities added over extremely wide ranges do not result in any substantial variation in the characteristics.

Summarizing the above, this invention provides a method wherein a salt of an impurity metal and sulfur are added to photoconductive crystals of the cadmium series which have been activated by Cl or Br and the impurity metal and the mixture is refired without utilizing any coactivator whereby to obtain highly sensitive fine powder of crystals of the cadmium series having thin surface layers containing deep trap levels but do not exchange any charge carrier between the exterior and interior of each crystal. When such crystals are formed into a photosensitive element by using a highly insulative binder, the element manifests intense P.I.P. effect which persists over a long period of time.

I claim:

1. In a method of preparing photosensitive powdered crystals of CdS manifesting persistent internal polarization effect comprising the steps of preparing photoconductive crystals of Cds activated by a monovalent metal and a halogen selected from the group consisting of Cl and Br, the improvement which comprises adding a salt of a monovalent metal selected from the group consisting of $Cu^{+}$ and $Ag^{+}$, and sulfur to said crystals of CdS and firing said mixture without utilizing any coactivator.

2. The method according to claim 1 wherein at the end of firing the firing atmosphere is rapidly exhausted to remove surplus sulfur.

3. The method according to claim 1 wherein said firing is performed in an inert gas atmosphere.

4. The method according to claim 1 wherein said firing is performed in air.

5. The method according to claim 1 wherein said firing is performed at a temperature of about 600° C. and the time of firing is about 15 minutes.

References Cited

UNITED STATES PATENTS

| | | | |
|---|---|---|---|
| 2,876,202 | 3/1959 | Busanovich et al. | 252—501 |
| 2,879,182 | 3/1959 | Pakswer et al. | 252—501X |
| 3,238,150 | 3/1966 | Behringer et al. | 96—1.5X |

GEORGE F. LESMES, Primary Examiner

R. E. MARTIN, Assistant Examiner

U.S. Cl. X.R.

252—501, 518; 106—301